United States Patent [19]

Herrick et al.

[11] 4,267,879
[45] May 19, 1981

[54] METHOD FOR FORMING GLAUBER'S SALT CRYSTALS OF REDUCED SIZE BY INCLUDING A FLUORINE-CONTAINING SURFACTANT

[75] Inventors: Carlyle S. Herrick, Alplaus; Fred F. Holub, Schenectady, both of N.Y.

[73] Assignee: General Electric Company, Schenectady, N.Y.

[21] Appl. No.: 68,415

[22] Filed: Aug. 21, 1979

[51] Int. Cl.³ .............................................. C09K 5/06
[52] U.S. Cl. .................................. 165/1; 165/104 S; 23/300; 23/302 T; 252/70; 423/266; 423/551
[58] Field of Search ................ 252/70; 23/300, 302 T; 423/266, 551; 165/1, 104 S

[56] References Cited

U.S. PATENT DOCUMENTS

| | | | |
|---|---|---|---|
| 2,954,282 | 9/1960 | Bauer et al. | 23/300 |
| 3,179,493 | 4/1965 | Diekmann et al. | 23/300 X |
| 3,770,390 | 11/1973 | Teot | 23/300 |
| 4,152,899 | 5/1979 | Herrick | 62/4 |
| 4,154,292 | 5/1979 | Herrick | 165/1 |
| 4,209,312 | 6/1980 | Herrick | 252/70 X |

OTHER PUBLICATIONS

"The Storage and Transfer of Low Potential Heat", Hodgins et al., Canadian Journal of Technology, vol. 33, 293-302, 1955.
Letter to the Editor-A. Whillier, "The Sun at Work", vol. 2, p. 2, Jun. 1957.
"Solar Heat Storage"-M. Telkes, 8 page ASME paper 64WA-SOL-9 (1964).

Primary Examiner—Harris A. Pitlick
Attorney, Agent, or Firm—Joseph T. Cohen; James C. Davis, Jr.

[57] ABSTRACT

The average size of Glauber's salt crystals formed by crystallization of $Na_2SO_4$ from aqueous solution in systems comprising $Na_2SO_4$, $H_2O$ and Glauber's salt is decreased by including a fluorine-containing surfactant in the system.

10 Claims, No Drawings

METHOD FOR FORMING GLAUBER'S SALT CRYSTALS OF REDUCED SIZE BY INCLUDING A FLUORINE-CONTAINING SURFACTANT

BACKGROUND OF THE INVENTION

This invention relates to utilization of size-limited crystals of $Na_2SO_4.10H_2O$ (Glauber's salt) as a liquid-solid phase change material in storage of thermal energy.

The invention is particularly applicable to the utilization of Glauber's salt as the solid form of a L-S P-C material in a thermal energy storage device, which imparts interparticle motion to crystals in the chemical system comprising $Na_2SO_4$ (sodium sulfate), water, and Glauber's salt.

Methods are known for storing thermal energy in and retrieving thermal energy from a liquid-solid phase-change (L-S P-C) material, for which sodium sulfate decahydrate is the solid form, wherein such material is maintained in a container and fluid is circulated over the outer surface thereof to effectuate heat exchange between the fluid and the L-S P-C material. A method and device of the foregoing types are described by Herrick in U.S. Pat. No. 4,154,292, which is incorporated herein by reference. As described therein with reference to the device (referred to therein as a "heat exchange device"), a liquid-solid phase-change material is sealed in a container, which is slowly rotated about a generally horizontal axis at a substantially constant rotational speed.

A problem encountered with utilization of Glauber's salt in the cycled storage of thermal energy is that the latter salt physically encapsulates $Na_2SO_4$ (sodium sulfate) during the freezing mode, i.e., during removal of thermal energy or heat from the chemical system. As used herein, the term "cycled storage" means the cycle comprising the steps of introducing thermal energy into and removal thereof from a L-S P-C material. In the chemical system comprising $Na_2SO_4$, $H_2O$ and $Na_2SO_4.10H_2O$ the resulting encapsulation by Glauber's salt of $Na_2SO_4$ decreases the rate of dissolution thereof in the liquid phase. Such dissolution is required for continuation of formation of Glauber's salt crystals from the $Na_2SO_4$ and water components of the system. Thus, the aforementioned dissolution of $Na_2SO_4$ is a prerequisite to maximizing the amount of Glauber's salt crystals which can be formed from (and concomitant release of heat for) a given amount of $Na_2SO_4$.

The rate of requisite dissolution of the encapsulated $Na_2SO_4$ decreases with increasing thickness of the encapsulating Glauber's salt wall and increases with decreasing thickness thereof. As a corollary, the resistance to diffusion or other movement of $Na_2SO_4$ through the encapsulating wall to the surrounding solubilizing aqueous liquid increases with increasing wall thickness and decreases with decreasing thickness thereof. As an overall result, such encapsulation decreases the rate of crystallization and the rate of heat release.

One approach to overcoming the foregoing problem is described by Herrick in U.S. patent application Ser. No. 706,895, filed Feb. 23, 1976, now U.S. Pat. No. 4,209,312 and incorporated herein by reference. Briefly stated, that approach includes addition of ferric ions with the goal of preventing the growth of large crystals.

It has now been found, by practice of the present invention, that the average size of Glauber's salt crystals formed by crystallization of $Na_2SO_4$ from aqueous solution in systems comprising $Na_2SO_4$, $H_2O$ and Glauber's salt is decreased by including a fluorine-containing surfactant in the system. It has further now been found that decreasing the average size of such crystals in this manner advantageously results in decreasing the average thickness of the $Na_2SO_4$-encapsulating wall of Glauber's salt, ultimately increasing the rate, extent, or both rate and extent of Glauber's salt crystal formation.

DESCRIPTION OF THE INVENTION

Generally stated, the present invention provides an improvement in the above method. The improvement comprises including in an admixture with the phase-change material in the container a water-miscible fluorine-containing surfactant selected from the group consisting of fluorine-substituted alkyl sulfonic acid, potassium salts of such acid, and mixtures thereof. The surfactant is included in an amount effective to limit the formation of sodium sulfate decahydrate crystals to an average size which is less than the average size of the crystals thereof which would be formed in the absence of the surfactant. The container is subjected to motion which will induce interparticle-motion of crystals present in the phase-change material.

The present invention will be more fully understood by referring to the following detailed description.

DETAILED DESCRIPTION OF THE INVENTION AND MANNER AND PROCESS OF MAKING AND USING IT

In using an embodiment of the heat exchange device described in the above-referenced U.S. Pat. No. 4,154,292 with a system comprising sodium sulfate, water and Glauber's salt sealed in a cylinder disposed horizontally and slowly rotated about its central axis, experience has shown that anhydrous sodium sulfate ($Na_2SO_4$) particles become encapsulated in solid $Na_2SO_4.10H_2O$ during the freezing cycle.

In accordance with the present invention, there is included in admixture with the phase change material in the container a water-miscible fluorine-substituted surfactant. Inclusion of the surfactant is in an amount thereof effective to limit the formation of sodium sulfate decahydrate crystals to an average size which is less than the average size of the crystals thereof which would be formed in the same system except in the absence of the surfactant. Advantageous results of including the fluorine-substituted surfactant include substantial reduction of the time for completing the liquid-to-solid phase change and increased extent of recovery of the latent heat of fusion of the L-S P-C material.

The fluorine-substituted surfactant is selected from the group consisting of fluorine-substituted alkyl sulfonic acid, potassium salts of the acid, and mixtures thereof. The alkyl group in the acid (and in the potassium salts thereof) may include, for example, from about 2 to about 20 carbon atoms per molecule. The acid is preferably perfluorooctyl sulfonic acid. The preferred surfactant is potassium perfluorooctyl sulfonate.

In general, from about 0.01 to about 10 parts by weight of the surfactant per 100 parts by weight of the phase-change material is effective for limiting the average size of Glauber's salt crystals as described above.

Practice of the present invention is further illustrated by the following illustrative and non-limiting example.

EXAMPLE

To a system of $Na_2SO_4$, $H_2O$ and Glauber's salt containing 25% by weight more $Na_2SO_4$ than the stoichiometric amount thereof for formation of Glauber's salt was added FC-95 (trademark of 3M Company for commercial grade potassium perfluorooctyl sulfonate) in an amount corresponding to about 0.014 part by weight FC-95 per 100 parts total weight of the above-indicated components of the system. When run through a cycled storage of thermal energy in accordance with the teachings of the above-referenced U.S. Pat. No. 4,154,292, the average crystal size was limited in diameter to about $\frac{1}{2}$ the diameter of crystals usually obtained in the absence of the surfactant. Quantitative calorimetric tests showed that 96% of the latent heat of fusion of $Na_2SO_4.10H_2O$ was recovered. In a comparative run conducted under the same conditions except in the absence of the surfactant, such tests showed that only 70% of the latent heat was recovered.

Best Mode Contemplated

The best mode contemplated at the time of executing this patent application for practicing the invention is set forth in the above detailed description, especially in the example.

It is understood that the foregoing detailed description is given merely by way of illustration and that many variations may be made therein without departing from the spirit or scope of the present invention.

What is claimed is:

1. In the method of storing thermal energy in and retrieving thermal energy from a liquid-solid phase-change material for which sodium sulfate decahydrate is the solid form, wherein said phase-change material is maintained in a container and fluid is circulated over the outer surface of said container to effectuate heat exchange between said fluid and said material, the improvement comprising the steps of:
   (A) including in admixture with said phase-change material in said container a water-miscible fluorine-containing surfactant selected from the group consisting of fluorine-substituted alkyl sulfonic acid, potassium salts of said acid, and mixtures thereof, said surfactant being included in an amount effective to limit the formation of sodium sulfate decahydrate crystals to an average size which is less than the average size of the crystals thereof which would be formed in the absence of said surfactant, and
   (B) subjecting said container to motion which will induce interparticle-motion of crystals present in said phase change material.

2. The improved method of claim 1, wherein the alkyl group in said acid includes from about 2 to about 20 carbon atoms.

3. The improved method of claim 1, wherein said acid is perfluorooctyl sulfonic acid.

4. The improved method of claim 1, wherein said surfactant is potassium perfluorooctyl sulfonate.

5. The improved method of claim 1, wherein said amount of said surfactant is from about 0.01 to about 10 parts by weight per 100 parts by weight of said phase-change material.

6. The improved method of claim 1, wherein said amount of said surfactant is from about 0.01 to about 10 parts by weight per 100 parts by weight of said phase-change material.

7. A liquid-solid phase-change mixture comprising sodium sulfate decahydrate and a water-miscible fluorine-containing surfactant selected from the group consisting of fluorine-substituted alkyl sulfonic acid, potassium salts of said acid, and mixtures thereof, said surfactant being included in an amount effective to limit the formation of sodium sulfate decahydrate crystals to an average size which is less than the average size of the crystals thereof which would be formed in the absence of said surfactant.

8. The mixture of claim 7, wherein the alkyl group in said acid includes from about 2 to about 20 carbon atoms.

9. The mixture of claim 7, wherein said acid is perfluorooctyl sulfonic acid.

10. The mixture of claim 7, wherein said surfactant is potassium perfluorooctyl sulfonate.

* * * * *